(12) United States Patent  (10) Patent No.: US 8,251,626 B1
Gonzalez et al.  (45) Date of Patent: Aug. 28, 2012

(54) BOLT AND RECEIVER FOR ADAPTIVELY ATTACHING TO SURFACES

(76) Inventors: Jose Gonzalez, Cataño, PR (US); Luis Figarella, Nashua, NH (US)

( * ) Notice: Subject to any disclaimer, the term of this patent is extended or adjusted under 35 U.S.C. 154(b) by 244 days.

(21) Appl. No.: 12/579,336

(22) Filed: Oct. 14, 2009

Related U.S. Application Data

(63) Continuation-in-part of application No. 11/677,061, filed on Feb. 21, 2007, now abandoned.

(51) Int. Cl.
*F16B 19/00* (2006.01)
*F16B 21/00* (2006.01)

(52) U.S. Cl. .................. 411/500; 411/509; 411/512

(58) Field of Classification Search .............. 411/500, 411/508–512, 383, 392; 404/16; 24/595.1, 24/594.11, 594.1
See application file for complete search history.

(56) References Cited

U.S. PATENT DOCUMENTS

| | | | |
|---|---|---|---|
| 2,127,037 A * | 8/1938 | La Croix | 404/16 |
| 3,516,337 A | 6/1970 | Gubela | |
| 3,740,083 A * | 6/1973 | Zenhausern | 403/243 |
| 4,850,778 A | 7/1989 | Clough et al. | |
| 4,955,982 A * | 9/1990 | Paulos | 404/11 |
| 4,971,498 A | 11/1990 | Goforthe | |
| 5,061,137 A * | 10/1991 | Gourd | 411/510 |
| 5,104,272 A * | 4/1992 | Dupont et al. | 411/339 |
| 5,428,935 A | 7/1995 | Mitchell | |
| 5,540,530 A | 7/1996 | Fazekas | |
| 5,542,225 A | 8/1996 | Endo et al. | |
| 5,671,576 A * | 9/1997 | Kluser | 52/512 |
| 5,907,938 A | 6/1999 | Sheahan | |
| 6,604,889 B1 | 8/2003 | Wood et al. | |
| 7,614,836 B2 * | 11/2009 | Mohiuddin et al. | 411/510 |

* cited by examiner

*Primary Examiner* — Flemming Saether
(74) *Attorney, Agent, or Firm* — Luis Figarella

(57) ABSTRACT

A bolt and receiver are provided to securely attach a device (e.g. light reflector or a lane marker) to a surface (such as a roadway). In addition to initially attaching the device to the surface, the bolt will nest progressively within the receiver as the surface thickness erodes or deteriorates over time, thus reducing the bolt's effective overall length (and thus the bolt's height above the surface), in order not to protrude and puncture or damage tires.

10 Claims, 8 Drawing Sheets

BOLT AND RECEIVER FOR ADAPTIVELY ATTACHING TO SURFACES

CROSS-REFERENCE TO RELATED APPLICATIONS

This application is a continuation-in-part application of pending U.S. application "Bolt and Receiver for adaptively attaching to surfaces", Ser. No. 11/677,061 filed Feb. 21, 2007, which is incorporated by reference in its entirety.

FIELD OF THE INVENTION

The present invention generally relates to the field of material attachment devices for surfaces that adjust their thickness and other such dimensions over time. More specifically the invention relates to the problem of securely attaching to a surface and over time adapting to its overall thickness variation. These may be used in devices for attaching devices to road surfaces.

BACKGROUND OF THE INVENTION

Safety on roads is significantly increased when devices such as lane markers or reflectors are attached to them. Because of its durability, flexibility and ease of application, many road surfaces are composed of asphalt mixes (typically 100 to 200 mm deep), placed over a concrete or crushed aggregate sub-surface bed. While excellent in regards to road traffic, these asphalt surfaces are sub-optimal attachment surfaces. Reflectors or lane marker devices are typically either chemically attached (e.g. glued or epoxy) or bolted to these asphalt road surfaces.

Unfortunately, because asphalt typically retains moisture, devices that are chemically attached to them typically become loosened over a fairly short time period, sometimes as brief as six months.

Gubela, U.S. Pat. No. 3,516,337 teaches of a complete lane marker with a built-in attachment bolt. Such devices sometimes remain attached to the road surface for longer terms, but may be loosened because of the flexible nature of the road surface.

Even if a device like this, attached through the road surface and into the road sub-surface would remain firmly attached, it would suffer from other disadvantages. Over time, the road surface is typically worn away or compressed by the weight of traffic and other factors, reducing its thickness over the road sub-surface. As a result, devices that are tightly bolted to the sub-surface may stick out. By doing this, they become the proverbial nail sticking out of the board. Such a "spike" could become dangerous to the tires of the vehicles transiting the road.

What is required is a way to hold securely the reflector or lane marker to the road surface in a manner that allows for it to remain at road level, while adapting to the overall lowering of the road surface over time. In some situations, it may be required to replace the reflector or bolt, without removing the receiver.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The invention is directed towards a bolt and fastener system consisting of at least two portions; the first is a male bolt or attachment composite that interfaces at the top with the reflector, lane marker or other object that is required to be fastened to the road. In this fashion, the bolt's top may be shaped in any shape that improves this interface to the object being fastened, or it may itself have shapes and/or devices intended to perform some of these functions. At the bolt's lower portion, there are depth detent mechanisms designed to nestle within the receiver's complementary depth detent mechanisms in a fashion that will allow the bolt to travel into the receiver over time (as the road surface becomes thinner), thus reducing the overall length of the bolt/receiver combination.

The receiver portion is intended to be firmly attached to the road sub-surface (typically either concrete or crushed aggregate material) via chemical (such as epoxy bonding), mechanical or other anchor means. Its upper portion is intended to be equipped with mechanical means that will allow the bolt to increase its penetration within the housing of the receiver (in response to any downward pressure), while preventing it from exiting the housing (rising).

Some aspects of the invention relate to the ability to design the depth detent mechanisms so that there is a "key" arrangement of these depth detent mechanisms, and upward pressure on the bolt, in combination with a rotational motion results in the bolt clearing the receiver without breakage.

The bolt and receiver proposed here are specifically tailored to road situations, but may also be applicable to application such as roofs, decks, etc., where a two (or more) layers of substrate are used.

Other features and advantages of the present invention will become apparent upon examining the following detailed description of an embodiment thereof, taken in conjunction with the attached drawings. The present invention may be implements in many forms including a device, method, or part of a device.

BRIEF DESCRIPTION OF THE DRAWINGS

The foregoing discussion will be understood more readily from the following detailed description of the invention with reference to the following drawings. The accompanying drawings are not intended to be drawn to scale. In the drawings, each identical or nearly identical component that is illustrated in various figures is represented by a like numeral. For purposes of clarity, not every component may be labeled in every drawing. In the drawings.

DEFINITIONS

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

Note that while one of the definition of bolt includes a helical thread, the applicant is using a definition similar to Webster's' #2, that of a metal bar or rod used to fasten a door. In this context, no thread (helical or otherwise) is implied on the bolt's body or exterior, but as a depth transmission and detent mechanism intended to preserve the top of the body (be it solid or composite as described) flush with the road surface, and preventing its body to come out of the receiver

DETAILED DESCRIPTION OF THE PREFERRED EMBODIMENT

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
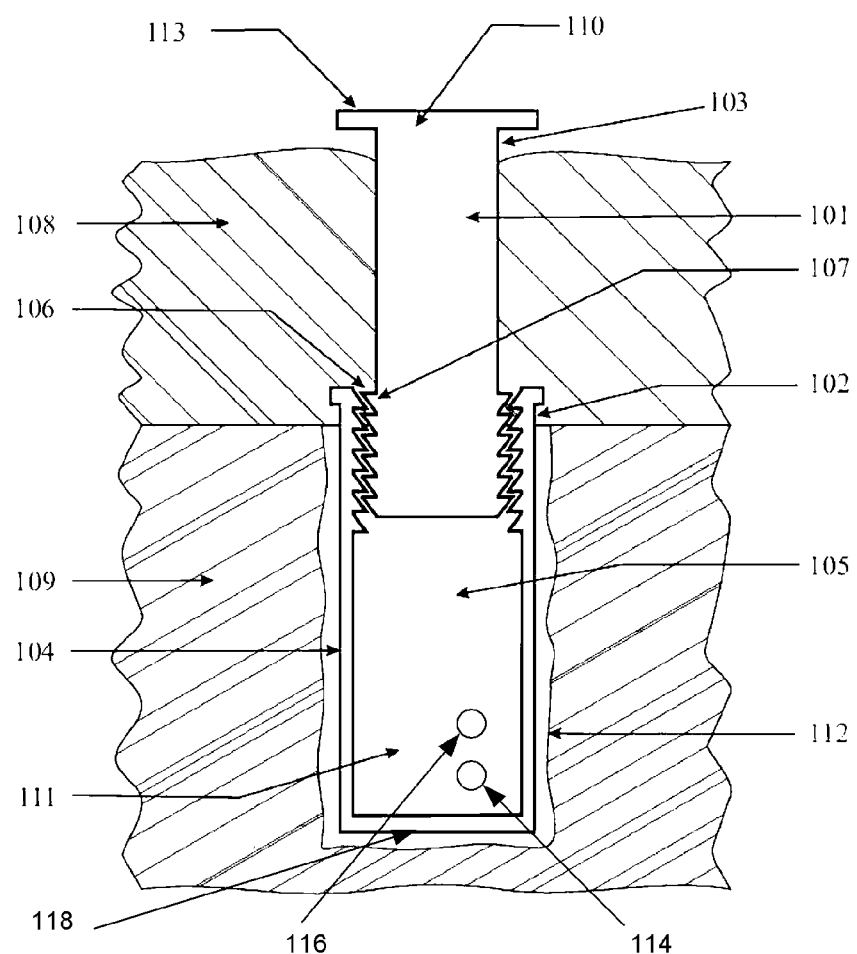
FIG. 1 is an exemplary illustration of the bolt and receiver configuration when the receiver is intended to be attached through chemical means to the road sub-surface, according to an illustrative embodiment of the invention.

In one embodiment, FIG. 1, the bolt 101 penetrates through the road surface 108 (typically an asphalt or concrete mix), into the receiver housing 102. In one embodiment, a reflector or road marker is fastened or attached to the head of the bolt 110, so that it remains flush with the top surface 103 of the road surface 108. The depth of the road surface is typically 100 to 200 mm, and hence the length of the road bolt 101 is determined by the road surface to be applied. This allows for the length of the bolt be tailored to the specific application so that sufficient travel of the bolt occurs inside the receiver 102 as the road thickness varies over time. Notice that the primary method of travel for the bolt within the receiver is direct downward pressure, not rotation.

In an alternated one embodiment, more than one set of depth detent mechanisms 107 may be staggered along the length of the bolt 101, so that if a bolt it too long for the application, its excessive length may be cut away and the upper set of detent mechanisms along its body are used as the principal ones.

The receiver housing 102 is designed to be placed within an opening 104 in the road sub-surface substrate 109 (or at the bottom of the road surface). This may be accomplished in a number of ways, depending on the sub-surface substrate. Sometimes, as shown in FIG. 1, the sub-surface substrate 109 is concrete or any other solid body (e.g. steel, which may be the sub-surface in the case of a bridge). In these cases, the opening 104 is drilled with a drill bit of diameter appropriate to allow for the receiver housing to drop in.

One embodiment envisions the opening 104 being filled with an adhesive (e.g. glue or epoxy) to securely attach the receiver housing 102 to the opening walls 112. The best embodiment also envisions the length of the receiver housing 102 being slightly longer than the expected depth of the drilled opening 104. In this fashion, the overflow of adhesive could be prevented from falling into the receiver housing internal opening 105, or with the operation of the depth detent mechanism 106, 107 for the bolt.

In one embodiment, the body of the receiver 102 is a sealed vessel, allowing for the cavity 111 to remain insulated from the area aside. However, alternate embodiments may include one or more openings (114, 116), along the periphery of the bottom of the receiver 102.

In another embodiment, the receiver would not have a bottom 118, allowing the body of the bolt to continue travelling downward, with the receiver depth detent mechanism 106 interacting with the detent mechanisms 107 higher in the bolt body, as long as the opening made for the receiver 102 extends downward and has the space to accommodate the bolt.

Figure 2:
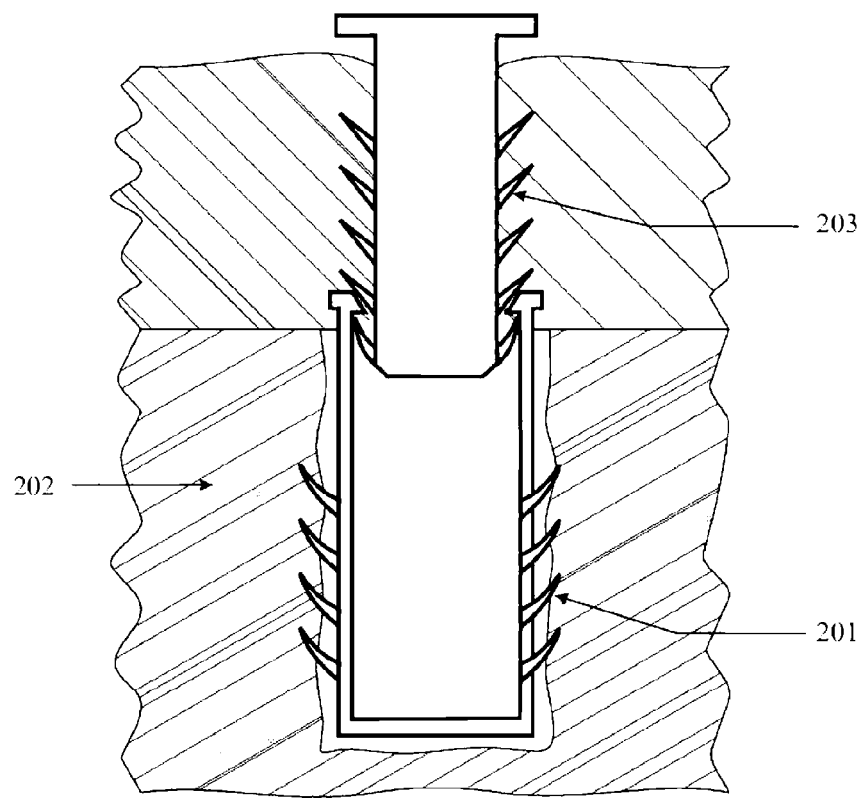
FIG. 2 is an exemplary illustration of the bolt and receiver configuration when the receiver is intended to be attached through mechanical means to the road sub-surface, according to an illustrative embodiment of the invention.

Besides the sub-surface described above, the other most popular type of road sub-surface FIG. 2 is some form of crushed aggregate 202. In this case, the receiver 102 may be equipped with mechanical protrusions 201 designed to secure it to the sub-surface 202 and prevent the receiver from exiting the opening 104 when the bolt 101 exerts any kind of upward pressure against the depth detent mechanism 106, 107.

Note that while in one embodiment the shape of the bolt 101 and receiver 102 is circular, any other number of complementary shapes may be designed, as long as the bolt is capable of nesting within the receiver over time. In addition, the top 113 of the bolt, may be shaped in any way. In one embodiment, both of these are hexagonally shaped, in order to allow for their rotation with a wrench or implement. Similarly, they may be mechanically keyed in order to accomplish the rotation and attachment function.

As time passes, the road erodes or is pushed downwards by vehicle traffic, effectively reducing its thickness. Vehicle traffic from lane changer (and or traffic early in the morning after the bars have closed!) will at times directly impact the top of the bolt (or its attached reflector). When this happens, a downward pressure will be exerted on the bolt. If the road thickness has been reduced, this will have the effect of driving down the bolt 101 into the receiver opening 105.

This opening within the receiver 105 is meant to be occupied by the road bolt 101 as the road surface 108 is compressed or worn away. This will allow for the bolt head 110 (and any device attached to it) to remain level with the top of the road surface as the road surface is compressed with time and use by vehicles. When sufficient travel has occurred, the progressive restrain 107 will advance over the next receiver holder 106. This has the effect of eliminating the bolt's ability to exit the receiver, thus shortening it's overall length, and securely attaching the bolt's top (and thus the reflector or lane marker attached to it) to the present road surface. The procedure is repeated anytime the road surface depth is shortened.

In an alternative embodiment, the progressive restraint 203 may be as simple as vanes, fins, pressure fins on the outside of the bolt 101, designed to progressively advance past the receiver opening as the road surface is reduced.

One embodiment for this progressive restraint 106 is a series of ridges at an angle of 45 degrees on the bolt that are allowed to moved past their counterpart 45 degree ridges on the wall of the receiver housing 105. However, it can be seen that ridges at other degrees, flexible flaps, spring-powered flaps, and other mechanical solutions may be equally employed.

Figure 3:
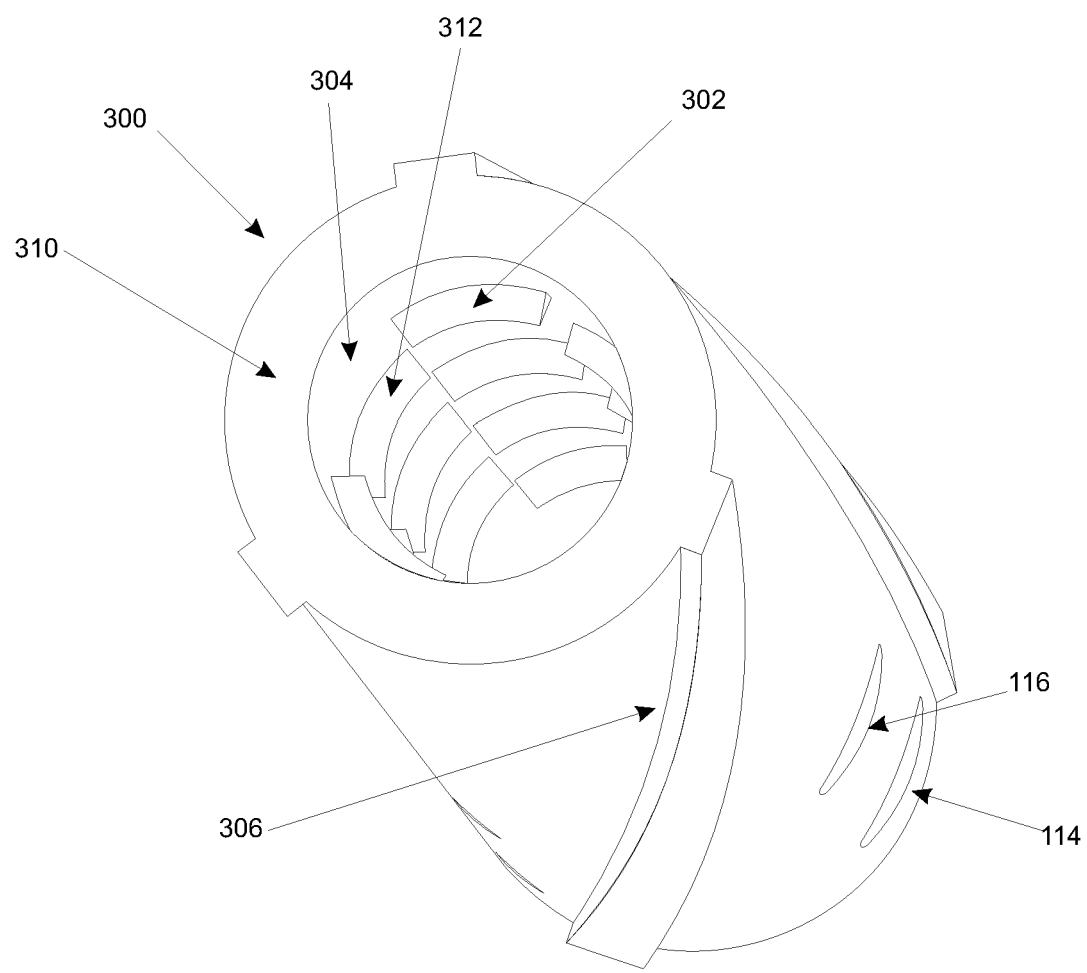
FIG. 3 is an exemplary illustration of the receiver, illustrating the entry point for the bolt, details of an exemplary detent mechanism within the receiver cavity, pressure ridges on the outside of the receiver and optional draining holes at the bottom, according to an illustrative embodiment of the invention.

FIG. 3 illustrates one embodiment of the receiver housing 300. In this embodiment, the opening 310 within which the bolt assembly enters is illustrated. The depth detent mechanism at one level 302 are implemented as a staggered and rotated set of partial rings at various depths. One set 302 occupies one level, leaving partial openings around their periphery 304, followed at the next depth (say 12.5 mm lower within the body of the receiver 102. At the next depth, the same pattern is repeated, but the depth detent mechanism 312 is rotated from the above by a given number of degrees. In this fashion, it is possible to remove the bolt assembly by pulling up on it, while at the same time rotating the bolt assembly. This results in the bolt coming out of the receiver in a series of "steps". When subjected to the normal use, the bolt 101 would not be subjected to such a series of rotations. Any bolt 101 coming up one of the above restraint level, would promptly come down upon the pressure of the next vehicle.

Note that when the receiver 102 has a bottom, its body is designed to be a vessel. Webster defines a vessel as: a container (as a cask, bottle, kettle, cup, or bowl) for holding something, not continually opened along the sides. Others, like Fazekas (U.S. Pat. No. 5,540,530), the receiver is a slot opening, and does not completely surround the bolt. Continually surrounding the bolt is critical of the invention, in order to keep road debris and detritus from clogging the opening intended for the bolt. In the alternate embodiment where the receiver 102 lacks a bottom 118, the receiver would still be appropriately described as a sleeve.

In one embodiment, the receiver is held against the opening 104 by a series of ridges 306 running along the outside of the receiver body 300. These would allow for the receiver 102 to be firmly attached to the opening 104.

Figure 4:
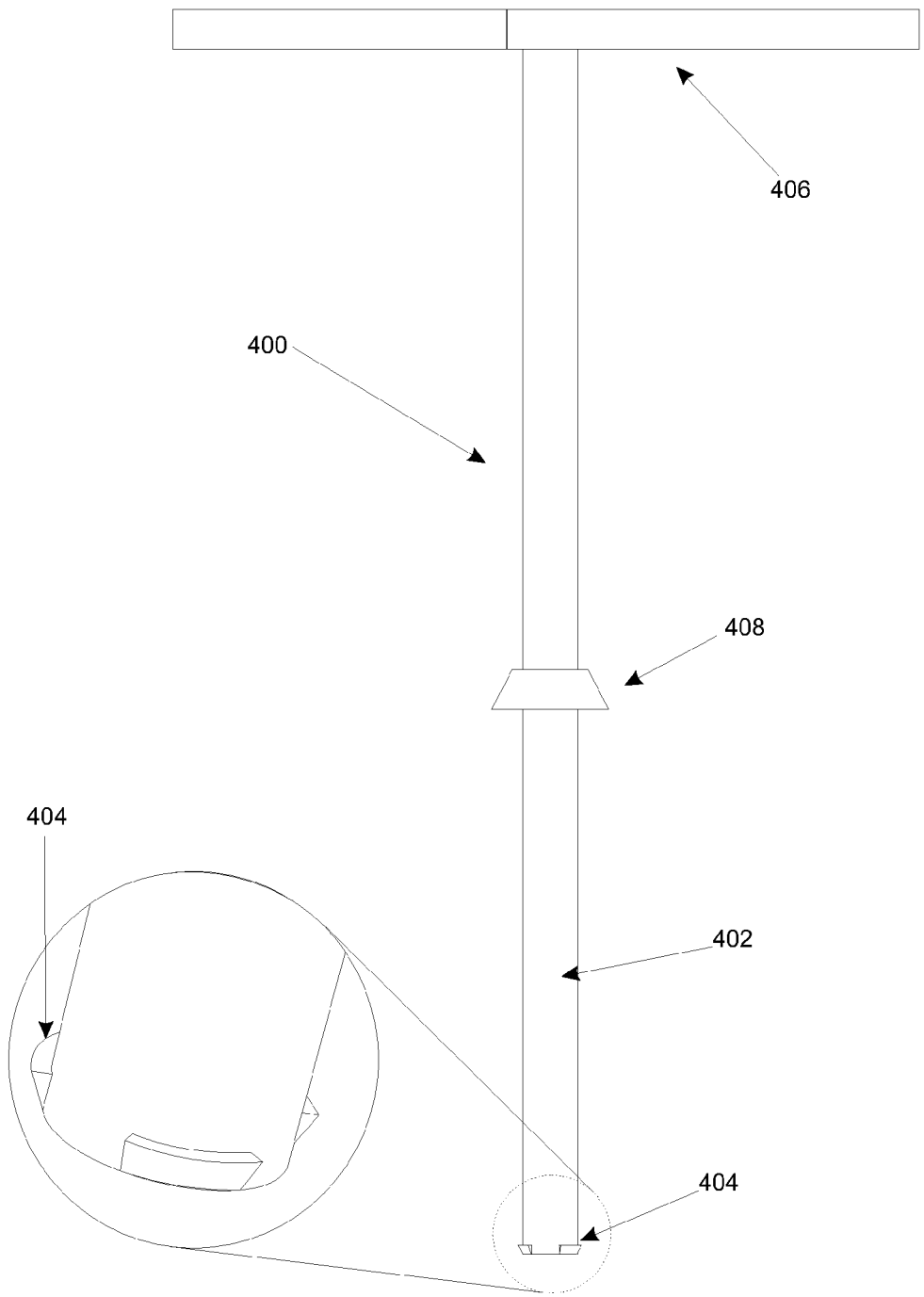
FIG. 4 is an exemplary illustration of the side view of the solid bolt, illustrating the partial circumference depth detent mechanisms keyed to the receiver layout, optional detritus control head, and reflector attachment top, according to an illustrative embodiment of the invention.

FIG. 4 illustrates an exemplary embodiment of the bolt assembly 400. It may be manufactured of any number of materials, including metal, plastic, wood, or any other solids. The bolt body 402, attaches the depth detent mechanism 404 to the reflector retaining mechanism 406. In some embodiments, there may be more than one depth detent mechanism 404 along the body of the bolt 402.

Figure 5:
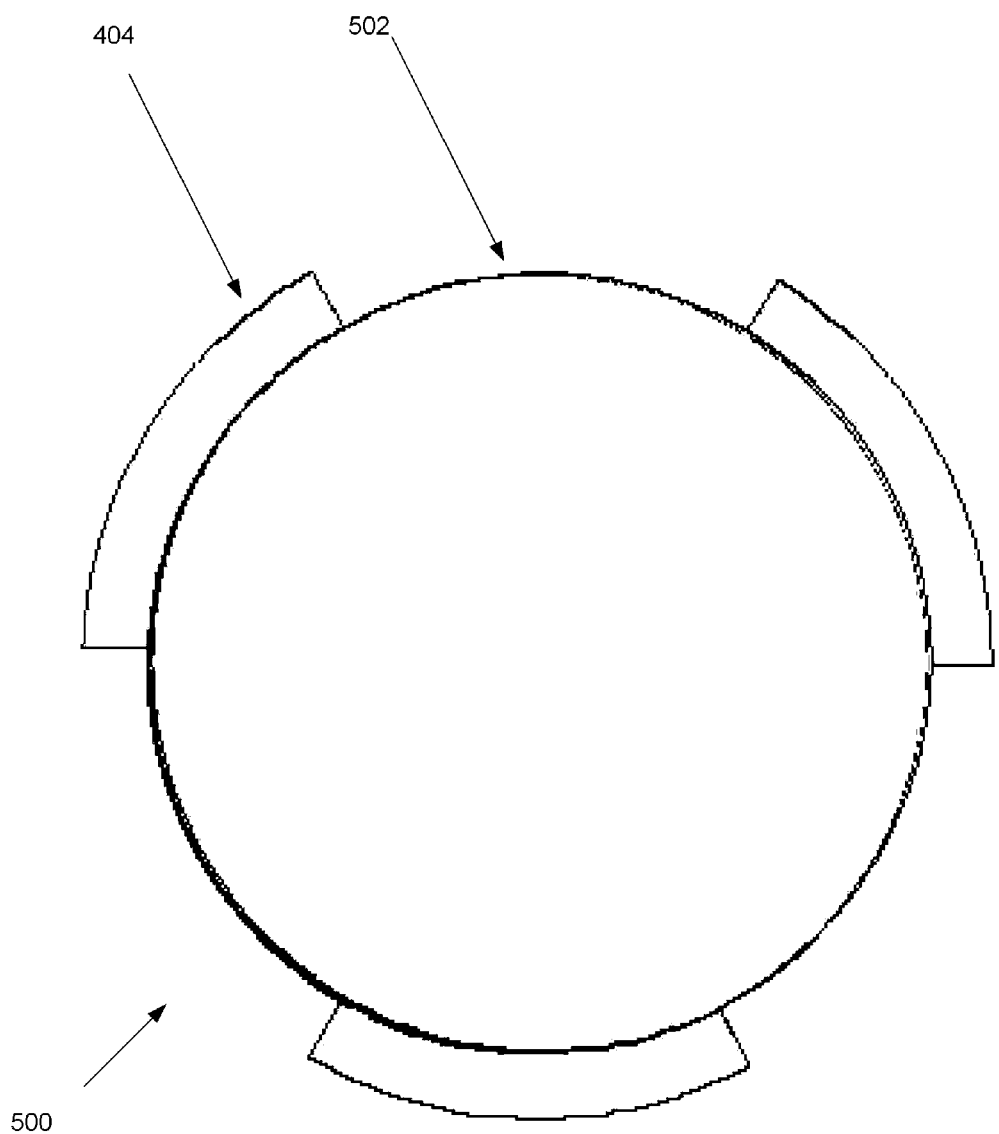
FIG. 5 is an exemplary illustration of the bottom cross section of the bolt's depth detent key, according to an illustrative embodiment of the invention.

In some embodiments, a sliding mechanism 408 is designed to slide down the body 402 of the bolt, resting at the entrance to the receiver 107. This would help by reducing the amount of debris and detritus falling into the receiver opening. FIG. 5 illustrates the top view of the bolt's depth detent mechanism 500, in the case where the bolts mechs 404 are equally spaced, creating spaces 502, along which the receiver's mechs 404 slide. Notice that while in one embodiment the depth detent mechanisms 404 are three (occupying 180 deg., with the depth detent mechanisms 302 in the receiver occupying the other 180 deg.), any number of these are possible, including non-asymmetrical ones where the bolt's mechs 404 or the receivers mechs 302 are not equally spaced or sized. In one embodiment, these mechs 404, 302 perform the depth detention function by their shape (45 deg. slots), that slide past each other by the slight expansion or bending of the tips.

Figure 6:
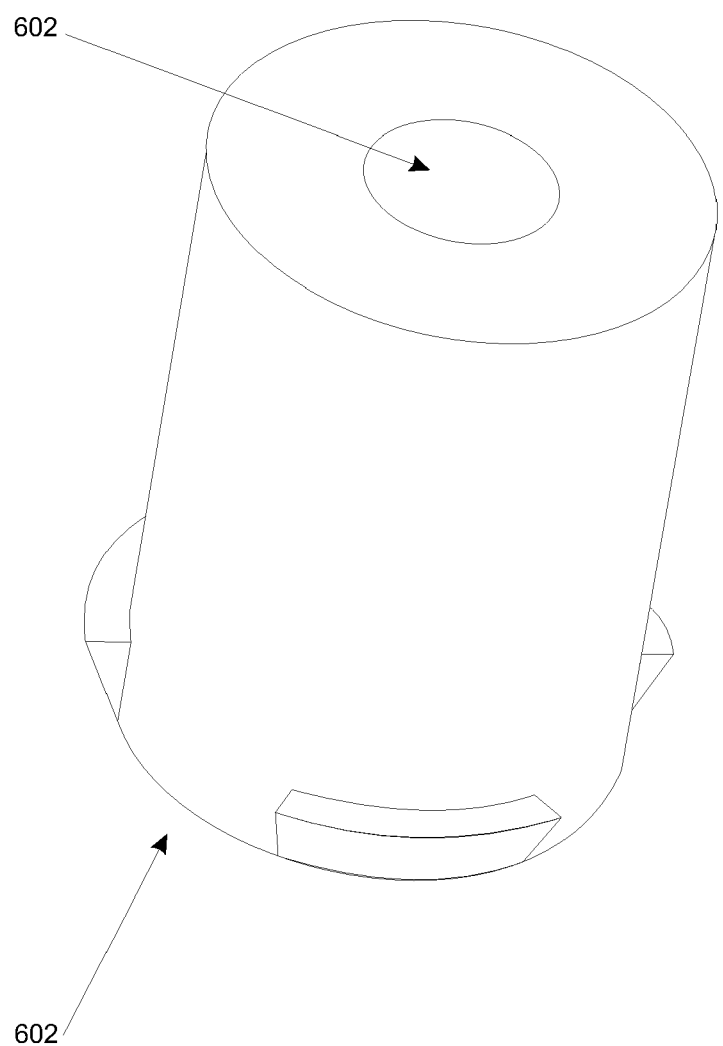
FIG. 6 is an exemplary illustration of the bolt tip of a composite bolt assembly, according to an illustrative embodiment of the invention.
Figure 7:
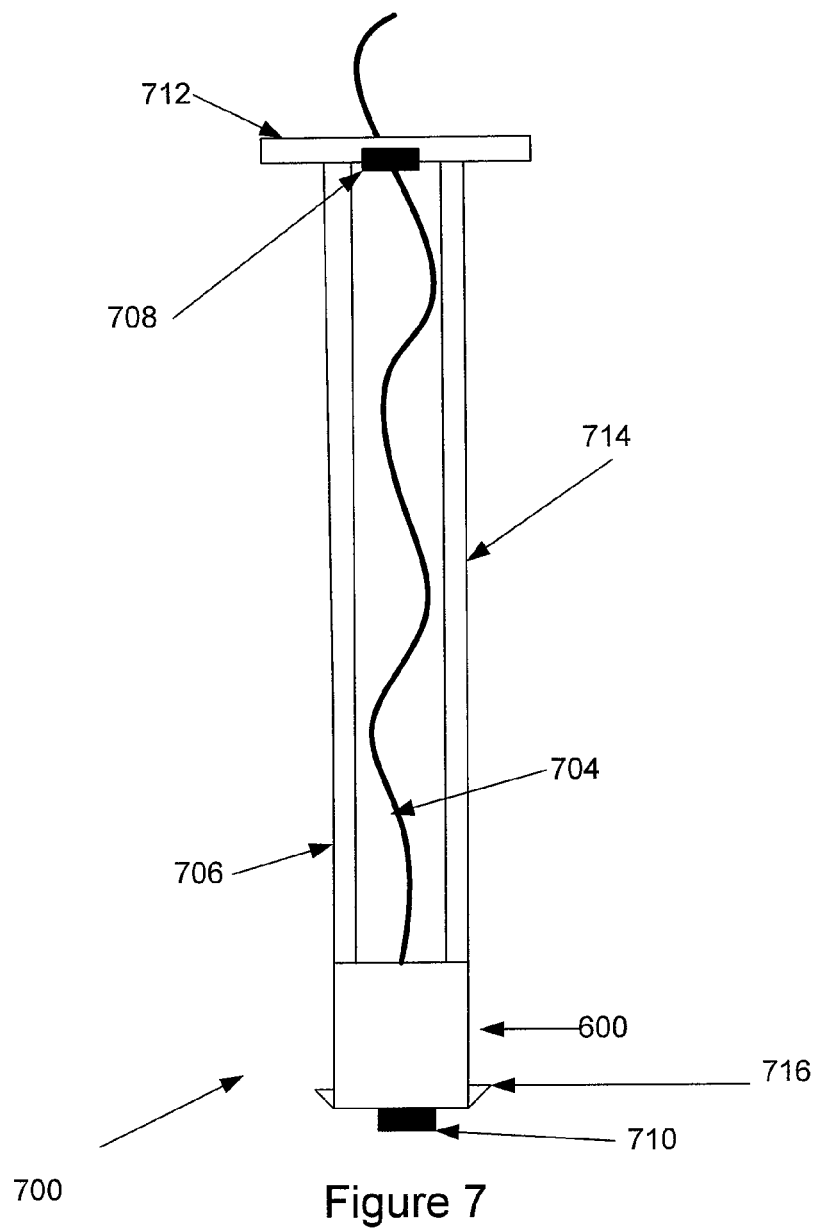
FIG. 7 is an exemplary illustration of the composite bolt assembly, according to an illustrative embodiment of the invention.

As seen in FIGS. 6 and 7, in an alternate embodiment, the bolt body 700 may be made into a composite combination of a solid tip 600 with tension and compression transfer means to the top 712 fastening the reflector or other above road attachment. The compression (or downward pressure transfer) is accomplished by a flexible, semi-flexible or rigid hollow body 714 whose outer dimension is designed to fit snugly within the opening of the receiver 102 opening. Note that the sidewall 706 illustrated is part of the continued body 714. This allows for any downward pressure on the top 712, to be transferred to the depth detent mechanisms 404 at the tip's 600 body along the outer walls 706 as contained by the receiver's opening.

Tension is transferred by means of a flexible or semi flexible tension member 704. This tension member 704 may be comprised of a string, rope, cable or strap manufactured of a number of materials, including organic material, plastic, kevlar-type material, metal or any other material suitable to transfer the upward tension from the depth detent mechanism 716 when any upward (away from the bottom of the opening 104) force is placed on the body 706 or top 712 of the composite assembly.

The tension is transferred by attaching the tension member 714 at both of its ends. In one embodiment, this is done by making the tip 702 hollow, and passing the tensile member through the opening in the tip 602, then securing it at the bottom 710. At the top, the tensile member is secured to the top 712 by a securing mean 708 (which as with the bottom, may be a nut, crimp, rivet or any of the well known ways to attach a cable). In an alternate embodiment, either the tip or the bottom may be equipped with a loop over which to loop the cable, with tensioning of it during manufacture being taken at the other end.

Figure 8:
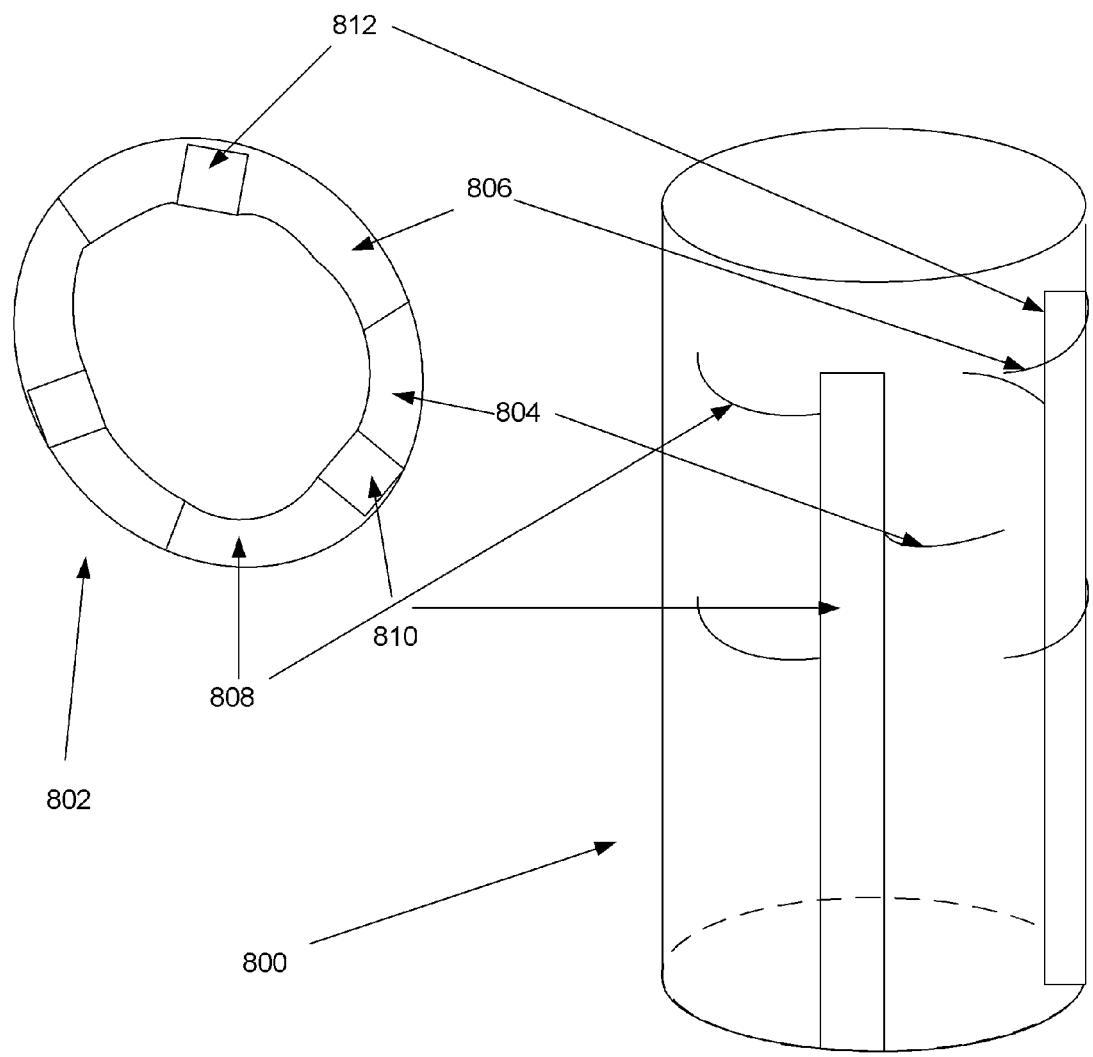
FIG. 8 is an exemplary illustration of the bolt rotation control means, according to an illustrative embodiment of the invention.

A final challenge solved by the invention is what to do with reflector assemblies that rotate their orientation to the driver. As can be seen from the invention, the free rotatable nature of the bolt with respect to the receiver may bring situations where over time, the reflector attached to the top 113 rotates too much with respect to the driver. To minimize this, in one embodiment, the depth detent mechanisms (804, 806, and 808) are paired off columns (810, 812) as shown in the isometric 800 and top views 802 of FIG. 8. This would cause the columns 810, 812 (as well as the third one not marked) to act as rotational restrictors, limiting in the case shown, the top reflector from rotating more than 120 deg. As can be easily discern, in a case where 10 deg. depth detent mechanism segments are used (as opposed to the 60 deg. shown in the exemplary embodiment), this would limit the rotation to 20 deg., well within the limits of most corner reflectors.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Further, acts, elements, and features discussed only in connection with one embodiment are not intended to be excluded from a similar role in other embodiments. It is to be appreciated that various alterations, modifications, and improvements can readily occur to those skilled in the art and that such alterations, modifications, and improvements are intended to be part of the disclosure and within the spirit and scope of the invention. Thus, for example, retrofitting existing devices is contemplated by the invention.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any preferred embodiments are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. The invention may be embodied in other specific forms without departing from the spirit or essential characteristics thereof. The forgoing embodiments are therefore to be considered in all respects illustrative, rather than limiting of the invention. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed:

1. An apparatus for securely attaching devices to a road surface comprising;
   a bolt comprising a tip member at a distal end, a compression transfer body member which interfaces with said tip at one end, a top member which interfaces with said body member at an opposite end from said tip member and, a tension member which connects said tip member to the top member, wherein said tip is equipped with one of more bolt depth detent mechanisms each comprised of a combination of a coaxial flexible tab and space sharing a particular axial level along the length of said bolt;
   a matching solid wall receiver with an internal closed bottom cavity having an opening at one distal end sized to receive said bolt and, plural receiver depth detent mechanisms each comprised of combination of a coaxial flexible tab and space complementary to those on said bolt tip member and located along the receiver cavity walls at more than one axial level so that the tab at one axial level is circumferentially offset with respect to the tab at an adjacent axial level so as to from staggered columns of tabs to act as a rotation restrictor for said one or more bolt depth detent mechanisms and;
   a means for securely attaching said solid wall receiver to an opening in a road sub-surface.

2. The apparatus of claim 1 wherein; each of said bolt depth detent mechanism and said receiver depth detent mechanism comprises a plurality of complementary tabs and spaces.

3. The apparatus of claim 1 wherein;
   the means for attaching the receiver to the road sub-surface comprise chemical bonding.

4. The apparatus of claim 3 wherein;
   said compression transfer body is hollow.

5. The apparatus of claim 4 wherein;
   said compression transfer body is flexible.

6. The apparatus of claim 4 wherein;
   said compression transfer body is semi-rigid.

7. The apparatus of claim 1 wherein;
   the means for attaching the receiver to the road sub-surface comprise mechanical attachment.

8. The apparatus of claim 7 wherein;
   said compression transfer body is hollow.

9. The apparatus of claim 8 wherein;
   said compression transfer body is flexible.

10. The apparatus of claim 8 wherein;
    said compression transfer body is semi-rigid.

* * * * *